United States Patent [19]

Thierry

[11] Patent Number: 4,881,809
[45] Date of Patent: Nov. 21, 1989

[54] METHOD AND DEVICE FOR MEASURING DISTANCE OPTICALLY

[75] Inventor: Bomer Thierry, Paris, France
[73] Assignee: Matra, Paris, France
[21] Appl. No.: 73,187
[22] Filed: Jul. 14, 1987

[30] Foreign Application Priority Data

Jul. 22, 1986 [FR] France ............................... 86 10621

[51] Int. Cl.⁴ ............................................. G01C 3/08
[52] U.S. Cl. .................................. 356/5; 250/203 R; 356/152
[58] Field of Search .................... 356/1, 5, 141, 152; 250/203 R

[56] References Cited

U.S. PATENT DOCUMENTS

| | | | |
|---|---|---|---|
| 4,355,895 | 10/1982 | Cairns et al. .......................... | 356/141 |
| 4,710,028 | 12/1987 | Grenier et al. ........................ | 356/141 |
| 4,728,795 | 3/1988 | Cross ................................... | 356/152 |
| 4,730,920 | 3/1988 | Schlemmer et al. ................. | 356/152 |

Primary Examiner—Stephen C. Buczinski
Attorney, Agent, or Firm—Larson and Taylor

[57] ABSTRACT

For optical measurement of a distance between a hunter and a target, for instance between satellites, back-reflecting means are provided on the target. The hunter carries a source of substantially monochromatic light pulses and a solid state detector having a matrix of sensors. The matrix is read-out by transferring the contents of the sensors line per line or point per point at a predetermined frequency to an output memory. A time base triggers one pulse at a predetermined time selected for causing return of an echo from the target during read-out. The distance is derived from a determination of that line or that point which receives the echo, for two different transfer frequencies.

8 Claims, 5 Drawing Sheets

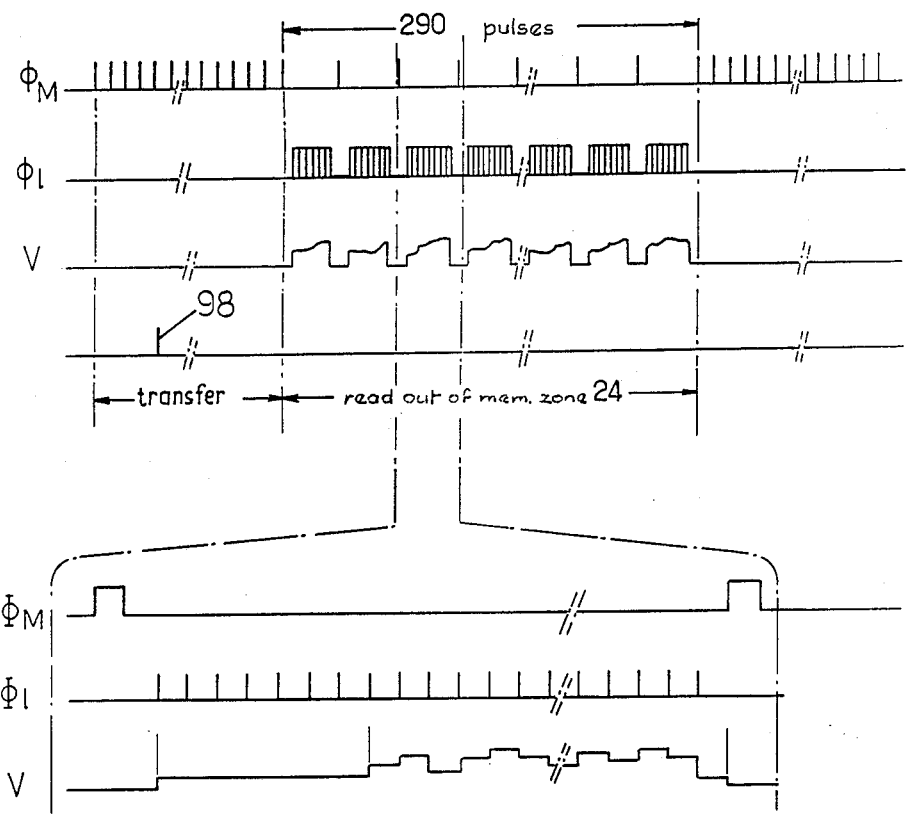
FIG. 8.
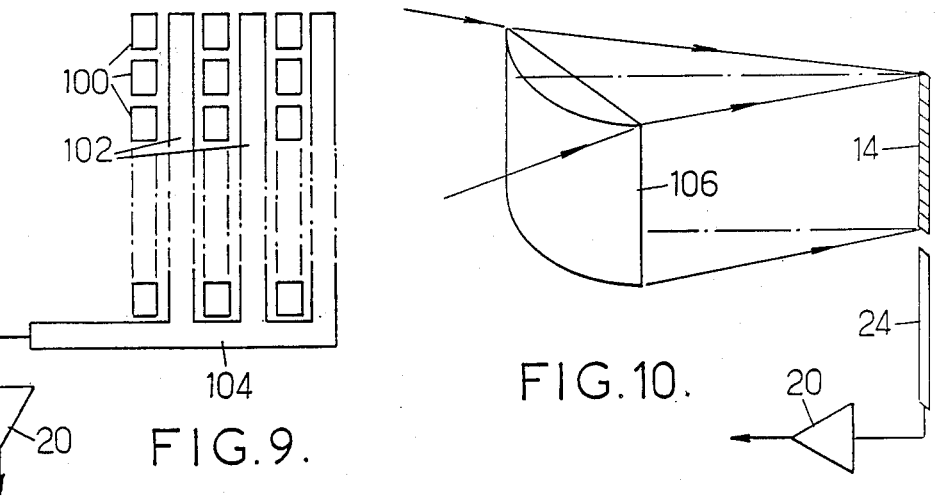
FIG. 9.
FIG. 10.

METHOD AND DEVICE FOR MEASURING DISTANCE OPTICALLY

BACKGROUND OF THE INVENTION

The invention relates to the measuring of distance between an active installation, which will be called hereafter "hunter" and a member passive in the measurement, which will be called hereafter "target". It finds a particularly important, although not exclusive, application for measuring the distance and position of the target with respect to the hunter, particularly for allowing the meeting and mooring of two space vehicles.

In the latter, case, it is necessary for the hunter to be provided with a device for:
  measuring the distance of the target and its position with respect to the hunter, as soon as the distance separating them is less than about 100 km,
  also determining the attitude of the target, but solely for much shorter distances, not exceeding a few tens of meters.

Measuring devices have already been proposed for use for this purpose including, on the target, several reflectors spaced apart in a given geometrical pattern and, on the hunter, a monochromatic light pulse source and a matrix detector for forming an image of the reflectors. The detector is generally formed by a matrix of charge coupled sensors or CCD. The attitude of the target with respect to the hunter is then determined by comparing the image obtained at a short distance with the known distribution pattern of the reflectors. At a short distance, it is also possible to measure the distance separating the hunter and the target by analysis of the image, but, as soon as the distance becomes great, it can no longer be determined by measuring the size of the target for this image is practically a pin point for the detector. In this case, it is known to determine the distance by measuring the flight time of a pulse delivered by the light source. The flight time is in effect equal to twice the distance divided by the speed of light.

But, when the distances are great, the power which returns to the hunter is very low and the problem arises of identifying the echo in the image, where parasites appear due to sources situated in the field, particularly when the sun is situated therein.

This problem is all the more serious since the conventional method of using the CCD includes a phase of accumulation of the charges generated in each of the sensors by the incident photons. The permanent sources, such as the sun, create charges during the whole duration of the integration phase, very much greater than the duration of the pulses delivered by the source.

It has already been proposed to overcome this problem by interposing, in the return path of the light echo to the CCD, a mechanical or optoelectronic shutter having an opening time almost equal to the time of the pulse delivered by the source. By moidifying the delay in opening of the shutter with respect to the emission of the pulse, the moment is sought when a maximum output signal is obtained. From the delay, which corresponds to the flight time, the distance may be derived.

This solution is unsatisfactory. The mechanical or optoelectronic shutter is expensive. Its use is complex. The measurement involves proceeding by trial and error so as to obtain coincidence between the return time of the pulse and the opening of the window, that is to say synchronizaton.

The invention aims at providing a measuring method and device answering better than those known heretofore the requirements of practice, particularly in that they allow distance measurements to be made without adding any mechanical or electromechanical member to the means which are in any case required for position and/or attitude measurement.

SUMMARY OF THE INVENTION

For this, the invention provides more particularly a method for the optical measurement of the distance between a hunter and a target, in which substantially monochromatic light pulses are emitted repetitively from the hunter in the direction of the target and the light flux reflected by the target is collected on a matrix detector with line by line or point by point transfer reading, characterized in that the transfer is carried out at a given frequency during the return of the reflected echo and in that the emission, collection and transfer sequence is repeated for at least two different transfer frequencies, the distance being derived from the shift between lines or points having received the echo for the two different frequencies.

The invention will be better understood from reading the following description of a particular embodiment, given by way of non limitative example, using as detector a frame transfer CCD of a type already used for short distance position and attitude measurements between space vehicles.

BRIEF DESCRIPTION OF THE DRAWINGS

FIG. 8 is a timing diagram of the signals which appear in the block diagram of FIG. 6;

FIG. 9 shows an interline transfer CCD also for implementing the invention; and

FIG. 10 shows schematically the use of a linear CCD strip for forming a distance measuring device.

DESCRIPTION OF THE INVENTION

Figure 1:
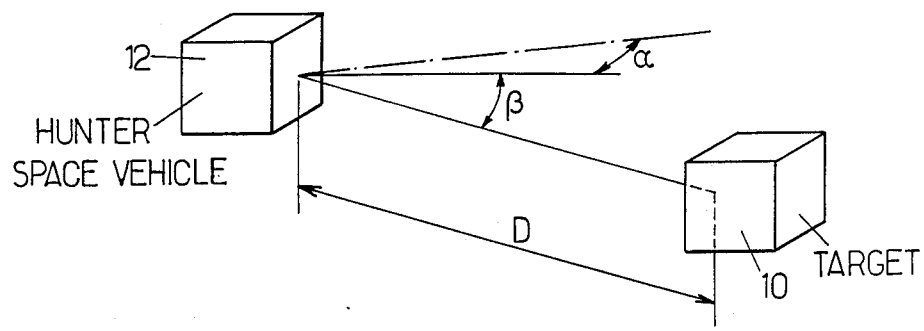
FIG. 1 is a general diagram showing the distance and position measurements to be made in view of a rendezvous in space.

The invention will be described in its application to the measurement of the distance and of the position of a target 10 with respect to a hunter 12, both formed by space vehicles. The device carried by the hunter 12 must allow the distance D to be determined as well as angles $\alpha$ and $\beta$ which define the orientation of the target with respect to a main axis of the hunter 12 (tangential to the trajectory for example). When the measuring device carried by the hunter must also determine the attitude of the target 10, this latter carries several back folding reflectors (not shown) distributed in accordance with a pattern recognizable by the device.

Measurement devices are already known comprising, on the hunter 12, a monochromatic pulse source (generally one or more laser diodes) and a solid state detector including a matrix of sensors. This detector is generally of the charge coupled type or CCD, having the construction shown in FIG. 2.

For bringing out the advantages of the invention, the conventional construction and operating mode of a CCD should first of all be recalled. The photosensitive element 14 of the CCD, called image zone, is formed by a semiconductor material wafer having a two dimensional matrix network formed of a large number of photosensitive sites 16, grouped in lines and columns. Each photosensitive site 16 forms a potential well which traps the electrons generated by interaction of the incident photons which it receives. During conventional use of a CCD, the electron packets are trapped in a potential well for a constant time, called integration time, and are then transferred to an output register 18 whence they are transformed sequentially into an analog voltage by a preamplifier 20 operating at video frequency. Transfer takes place pixel by pixel in the same line, under the control of a clock 22.

It can be seen that the photosensitive sites also form shift registers. But, since these registers in the image zone 14 are photosensitive, it has been thought up to now that the number of electrons generated during the reading phase should be negligible with respect to the number generated during the integration phase, so as not to disturb the image. Now, the reading stage, including the output register 18, is slow for it has a very large number of pixels to read.

For this reason, in a so called frame transfer CCD, a memory zone 24 is inserted between the image zone 14 and the output register 18. The memory zone is formed of elements distributed in a matrix identical to that of the image zone, but not photosensitive. Each of the elements of the memory zone stores the packet of electrons created in the corresponding photosensitive site of the image zone 14, without disturbances. Transfer of the contents of the image zone 14 into the memory zone 24 takes place at a rate fixed by a line transfer clock 25, one line at a time.

Figure 2:
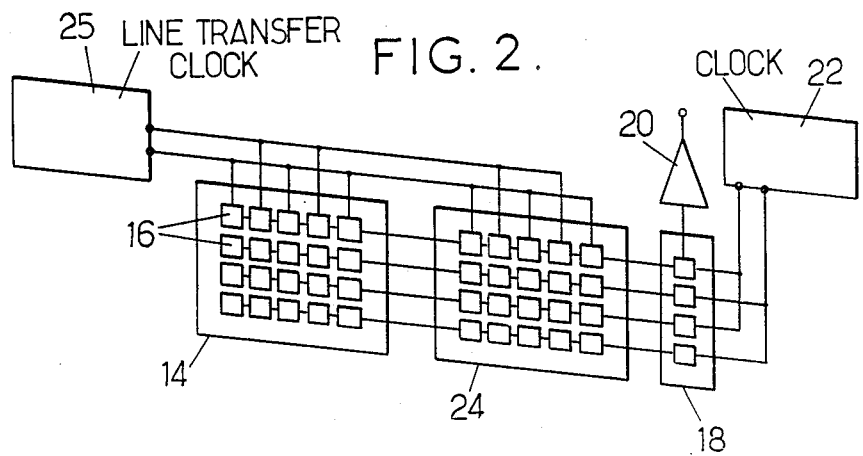
FIG. 2 is a general diagram showing the construction of a frame transfer CCD.

The CCD shown in FIG. 2 is too slow for measuring the flight time of a light pulse with good resolution: it must consequently be associated with a distance measurement device, formed for example by a mechanical or optoelectronic shutter and a measuring chain. In addition, the fraction of incident light which returns to the hunter is very low. To be able to distinguish the echo, a very powerful light source is required which can in practice only be a pulsed source. But the possibility of obtaining a very short integration time in the image zone 14 of a CCD makes it further necessary to add the shutter which is an expensive component and, in addition, only supplies a measurement after a period of distance searching.

By way of example, CCDs are available at the present time whose image zone 14 includes photosensitive site distributed in a matrix of 384 columns and 290 lines. The memory zone 24 includes the same number of components.

Conventionally, the sequence of operations during use in a CCD of the kind shown in FIG. 2 is as follows:
unloading the image zone 14 by transferring electron packets from one line to the next and from the last line of the image zone to the first line of the memory zone 24, at a rate which may be 1M-line per second;
integration phase, during which the charges generated in the image zone by the incident photons are accumulated, the sensitivity of the detector depending on the duration of this phase (generally going from 1 ms to a few seconds);
transfer of the charges accumulated in the image zone 14 to the memory zone 24, by shifting of the lines, caused by 290 successive transfer pulses delivered by the clock 25;
reading of the memory zone 24, by shifting by one line at a time in the output register 18, then shifting this register, at a speed which may be 1M pixel, or 2.5 klines per second.

If this arrangement is used, it can be seen that, during the phases of unloading the memory zone 24 and transfer to the memory zone, the electrons which continue to be generated in the photosensitive sites of the image zone 14 are located at a different position from that which they would have in the image formed during the integration phase. So that they do not disturb the measurements, in the conventional method of using a CCD, the integration phase must have a duration very much greater than the duration of the unloading and transfer phases.

The invention uses a method which may be considered as totally opposite, consisting in suppressing the integration phase, or at least in reducing it to the duration of the transfer time of a line. The image delivered by the memory zone 24 is then formed of columns in which each pixel represents the sum of the elementary charges cumulated each one during the duration of the transfer pulse delivered by clock 25 for a position in the respective column, during travel through the image zone 14.

If the scene to be observed has an illumination which is constant in time, all the pixels of the same column will have received the same number of photons and they will all have the same level. If the scene does not have homogeneous illumination, the image will be formed by spectral lines whose levels correspond to the mean illumination of respective columns;

If, on the contrary, one of the photodetector sites of the image zone 14 receives a brief light pulse, of a duration less than that of the transfer pulses, the charges are only generated in this site for the duration of the light pulse; since there is no transfer during this time interval, the image will be sharp.

With this practice, it is possible:
to eliminate the parasite illuminations, for example by subtracting the signals corresponding to two successive pixels of the same column;
because the detector is now very fast, to measure the flight time of the light pulse, which results in a shift of the representation of the echo on the image with respect to the representation which would have been obtained by working in accordance with a traditional method.

Since, moreover, there has been no modification of the position of the echo in the direction of the lines of the matrix, the new method of working in no wise prevents measurements from being made in the scanning direction, that is to say determining for example the angle $\alpha$ of FIG. 1. As for angle $\beta$, it may be determined by making two successive measurements with different transfer frequencies.

Figure 5:
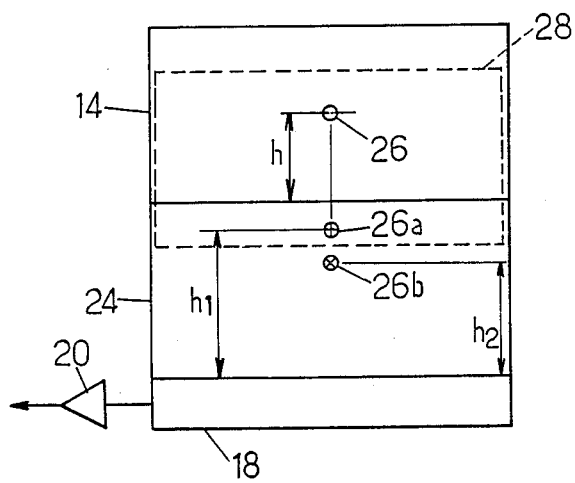
FIG. 5 is a diagram showing the difference in position of the apparent image as a function of the return time of the echo with respect to the transfer sequence.
Figure 3:
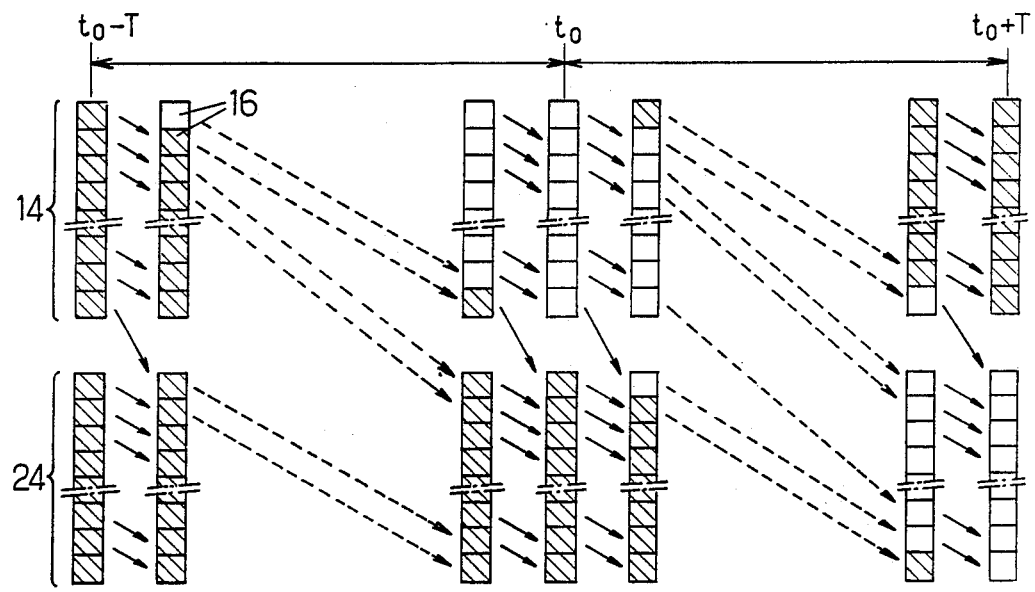
FIG. 3 shows, from left to right, the successive transfers undergone by the pixels of a column of the CCD (the hatched squares designating the pixels which do not give rise to reading by the output register)
Figure 4:
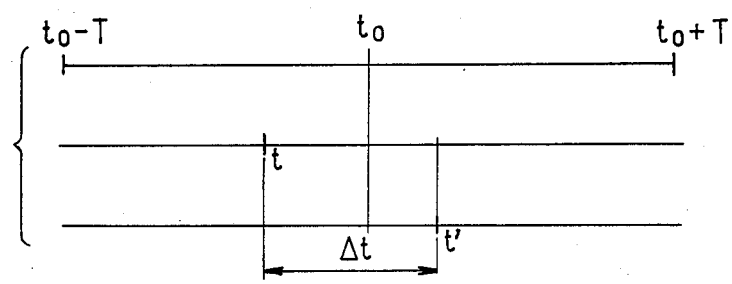
FIG. 4 shows the succession in time of an illumination pulse, of the beginning of the frame transfer and of the echo return time.

FIG. 3 shows the staggering of the transfers with respect to the time t of the light pulse delivered by the source of the hunter 12. The time T is that required for the successive transfers of 290 lines, fixed by the frequency of clock 25. If it is assumed that the image of the echo is formed on the photosensitive site 26 situated in the middle of the image zone 14 (FIG. 5), because the echo returns to the CCD at a time when the transfer has brought this image zone to 28, the representation appears at 26a during reading. If we designate by $t_0$, t and $t'$ the times of the end of the first transfer, of sending the illumination pulse and of the echo return, respectively, and by $f_1$ and $f_2$ two successive transfer frequency values, which lead to heights of the representation in the images h1 and h2, we have:

$$h1 = h + \alpha \cdot f_1(t' - t_0)$$

$$h2 = h + \alpha \cdot f_2(t' - t_0)$$

from which we derive the time of flight $\delta t = t' - t$, equal to twice the distance divided by the speed of light $$\delta t = t' - t = [(h1 - h2)/\alpha(f_1 - f_2)] + (t_0 - t)$$

and:

$$h = h1 - f_1[(h1 - h2)/(f_1 - f_2)]$$

It can be seen that thus, on the one hand, the time of flight may be determined from which the distance is derived, and, on the other hand, the position of the target in the direction of the columns for instance $\beta$ which is a direct function of h.

The representation of the illumination pulse is formed by a spot. Using illumination barycenter search techniques, spatial resolution of measurement may be obtained reaching about 0.02 pixel. Since the maximum transfer frequency is about 1 Mline per second, the resolution obtained may be 0.02 $\mu$s with respect to the flight time, namely 3 meters with respect to the distance.

It is possible, by advancing or retarding the time t of the illumination pulse with respect to the time $t_0$, to create an upwards or downwards shift of the image and, therefore, not to reduce the field of view of the device with respect to that of the image zone 14.

Figure 6:
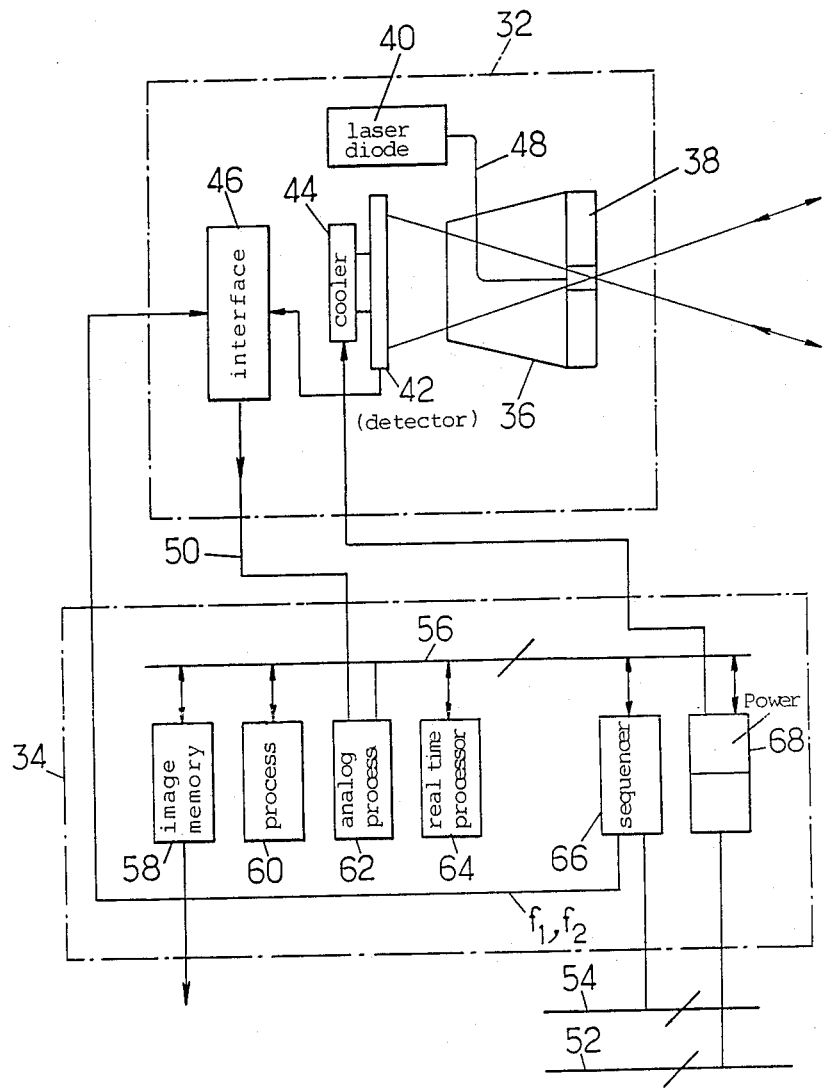
FIGS. 6 and 6A are respectively a general diagram and a functional diagram of a device using a frame transfer CCD.

The general construction of the measurement device may be that shown schematically in FIG. 6. The device shown in this Figure includes an optical head 32 and an electronic unit 34. Head 32 includes an objective lens 36 with an optical input filter 38 whose pass band corresponds to the emission spectral ray of the laser diode 40 forming the pulse source. The optical head further contains the CCD detector 42 on which the image delivered by objective 36 is formed. This CCD is provided with a Peltier cooler 44 having a supply circuit 68. The optical head 32 further contains an interface box 46 receiving clock signals from unit 34, as will be seen further on. By means of an optical guide 48, the optical transmission of the laser diode 40 is transmitted to the axis of the objective 36. The purpose of interface 46 is essentially to match the clocks and the video signal retransmitted over a line 50 to the electronic unit 34.

The electronic unit 34 is connected to the optical head 32; it is also connected to the power bus 52 and the data bus 54 of the space vehicle which carries the device. This unit has an internal bus 56 to which the different circuits are connected providing:
  sequencing of the CCD,
  analog processing of the video signal from the optical head,
  digital processing of the signal after digitization (particularly substraction of the brightnesses corresponding to two successive points of the same column),
  controls and computations,
  power supply of the different circuits of the electronic unit 34 and of the optical head 32,
  control and power supply of the Peltier effect cooler 44,
  control and power supply of the laser diode 40.

The general construction of unit 34 may for instance be as shown in FIG. 6 which includes the following components, connected to the internal bus 56:
  an image memory 58, with an output connected to a transceiver for radio connection with the ground, and transmission of measurement data,
  processor 60,
  an analog unit 62 for analog processing of the video signal and A/D conversion,
  a real time processing unit 64,
  a sequencer 66, which will be described in detail further on, delivering clock signals to the interface 46.
  a power circuit 68 containing a DC-DC converter and also providing temperature regulation by controlling circuit 44.

Figure 6A:
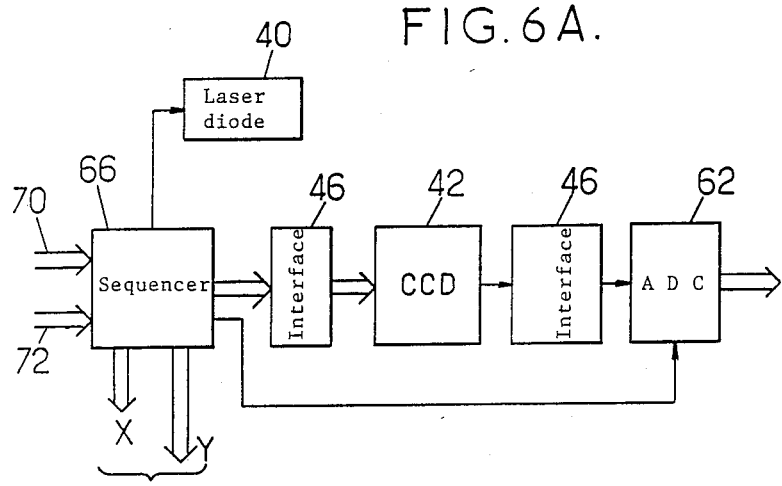

Many of the components of such a device are identical to those which are found in distance measurement devices using an electroptical shutter. However, the functional diagram is of the kind shown in FIG. 6A. The sequencer 66, in response to inputs 70 and 72 representing the transfer frequency to be adopted and the delay before triggering of the laser diode, delivers a control pulse to the laser diode 40, clock pulses to the interface 46 and the addresses of the pixels during a transfer, in the form of X and Y coordinates in the matrix (corresponding to angles $\alpha$ and $\beta$ of FIG. 1).

Figure 7:
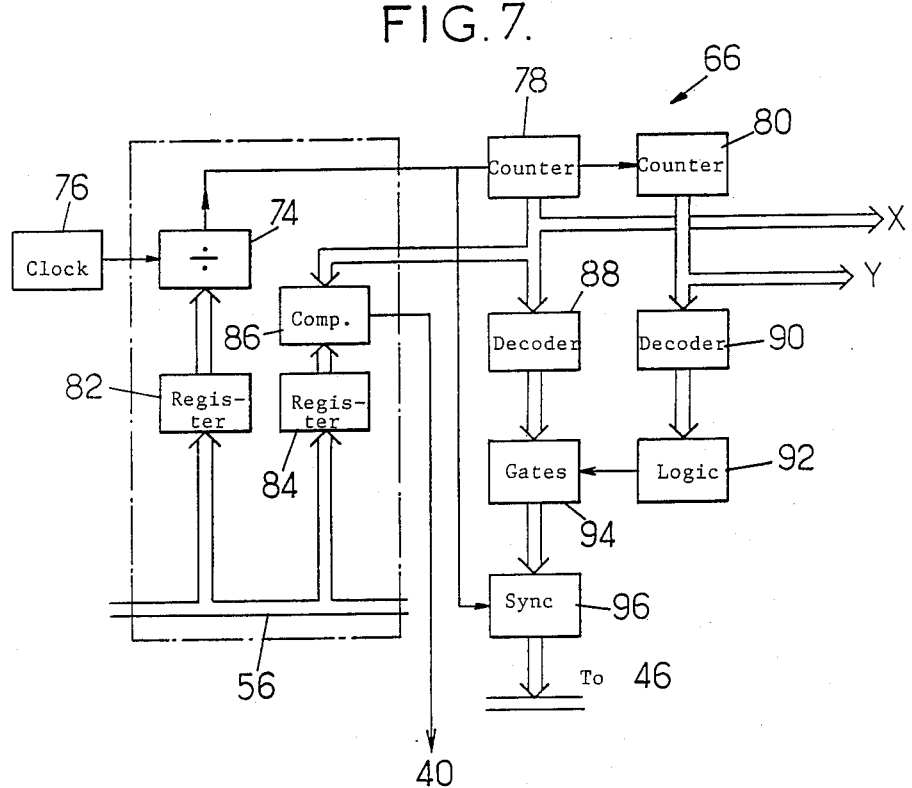
FIG. 7 is a block diagram of the sequencer of the device shown in FIG. 6A.

The sequence may particularly have the construction shown in FIG. 7: compared with a sequencer for star sensing device, the additional components are those situated in the dash dot frame. The sequencer 66 includes a programmable divider 74 receiving signals from a local clock 76 and feeding a pixel counter 78 in cascade with a line counter 80. Both of the counters may be 9 bit counters delivering at their output the X and Y coordinates of each pixel in turn. Divider 74 is programmed by a register 82 from data delivered by the local bus 56. This bus also allows a register 84 to be loaded for programming the triggering delay of the laser diode 40 defining the time t. The triggering of 40 itself is caused by a comparator 86 comparing the contents of the register and the output of the pixel counter 78. The two counters 78 and 80 are each associated with a decoder 88 or 90. The decoder 90 drives control logic 92 which causes a network of gates 94 to be enabled supplying a synchronization circuit 96 delivering the different control signals required to the CCD.

FIG. 8 is a timing diagram of the different signals generated. The lines identified by $\psi m$ (the bottom line representing on a larger scale a part of the top line)

indicate the succession in time of the transfer signals inthe memory zone. The lines ψ1 show the reading signals in the memory zone. The video signal may have the form shown by lines V. The first seven reading pulses may form a prereading which is not used in processing the image. Finally, the signals delivered by gates 94 further include a pulse 98 for synchronizing the laser diode. The flight time due to the distance is compensated for by programming the register 84 from the local bus 56.

The invention is not limited to the particular embodiment which has been described above by way of example. Numerous variants are possible. In particular, instead of a frame transfer CCD, a line transfer CCD may be used. In such a CCD, the photosensitive sites 100 are disposed in lines each adjacent to a shift register 102, as is shown in FIG. 9. All the registers are connected to an output register 104 which itself drives a video preamplifier 20. The registers are not photosensitive and, in a conventional operation of the CCD, all the electron packets generated in the photosensitive sites are transferred at the end of integration into the shift registers and these latter are read through the output register 104. Such a type of register may also be adapted for implementing the invention.

Finally, when a measurement of the position of the target in direction X is not desired, the CCD may be reduced to a simple strip including an image zone 14 and a memory zone 24. In this case, the optical image forming system 106 is provided for forming a linear image.

I claim:

1. Optical process for measurement of a distance between a hunter and a target, comprising the steps of:
    (a) sending substantially monochromatic light pulses from the hunter toward the target;
    (b) collecting light echoed by the target on a matrix detector having photosensitive sites distributed in lines and columns with line-by-line transfer read-out
    (c) carrying out said transfer read-out in the direction of the columns at a first predetermined frequency during the time of flight between sending and return of the reflected echo from said target;
    (d) repeating the sequence of steps (a), (b) and (c) with another predetermined transfer frequency, different from the first frequency; and
    (e) deriving the distance from the distance between lines of the matrix having received the echo for the two different frequencies.

2. A device for the optical measurement of a distance between a hunter and a target, comprising back reflecting means on the target and, on the hunter:
    a source of substantially monochromatic light pulses;
    a solid state detector having a matrix of sensors distributed into lines and columns;
    optical means for forming an image of light echoed by said reflecting means as a spot on one of said sensors;
    means for reading out said matrix of sensors by transferring the output of said sensors line per line or point per point in the direction of said columns, at a predetermined frequency to a detector output means;
    timing means for triggering one said light pulse at a predetermined time selected with respect to the beginning of said transfer for causing return of an echo from said target during transfer by the read-out means; and
    computing means for deriving said distance from an identification of those lines or those points which received echos associated with two different transfer frequencies.

3. Device according to claim 2, wherein said computing means are arranged for subtracting the brightnesses of two mutually adjacent points of a same column for suppressing the effect of permanent lighting.

4. Device according to claim 2, further comprising means for adjusting the time period between the light pulse and the beginning of the transfer as a function of the back and forth time separating said light pulse and the echo at a value selected for the echo to be received during the transfer.

5. Device according to claim 2, wherein said detector consists of a CCD detector comprising an image zone consisting of a first matrix network of light responsive sensors distributed into said lines and columns and a memory zone which also consists of a second matrix network identical to the first, said read-out means being arranged for line-by-line transfer of the content of the image zone into the memory zone and from the memory zone into an output register from which the pixels of a same line are read-out sequentially.

6. Device according to claim 5, wherein said source consists of a laser diode which delivers the light pulses along an axis of said optical means.

7. Device according to claim 4, wherein said detector consists of a CCD detector comprising an image zone consisting of a first matrix network of light responsive sensors distributed into said lines and columns and a memory zone which also consists of a second matrix network identical to the first, said read-out means being arranged for line-by-line transfer of the content of the image zone into the memory zone and from the memory zone into an output register from which the pixels of a same line are read-out sequentially.

8. Process according to claim 1, wherein each of the lines has one photosensitive site only whereby the matrix detector has a single column, wherein said light pulseechoed by the target is focussed on the single column of photosensitive sites.

* * * * *